(12) United States Patent
Cha

(10) Patent No.: US 9,714,680 B2
(45) Date of Patent: Jul. 25, 2017

(54) ASSEMBLING DEVICE FOR BUSH

(71) Applicant: HYUNDAI MOBIS CO., LTD., Seoul (KR)

(72) Inventor: Seung Hwan Cha, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 225 days.

(21) Appl. No.: 14/477,666

(22) Filed: Sep. 4, 2014

(65) Prior Publication Data

US 2015/0113797 A1    Apr. 30, 2015

(30) Foreign Application Priority Data

Oct. 25, 2013  (KR) ........................ 10-2013-0128116

(51) Int. Cl.
| | | |
|---|---|---|
| F16F 7/00 | (2006.01) | |
| F16C 43/04 | (2006.01) | |
| F16F 1/38 | (2006.01) | |
| B60G 7/02 | (2006.01) | |
| F16F 5/00 | (2006.01) | |

(52) U.S. Cl.
CPC ................ F16C 43/04 (2013.01); B60G 7/02 (2013.01); F16F 1/3842 (2013.01); B60G 2204/41 (2013.01); Y10T 29/53104 (2015.01)

(58) Field of Classification Search
CPC ...... F16F 13/14; F16F 13/1445; F16F 1/3842; B60G 2204/41; B60G 7/02; F16C 43/04; Y10T 29/53104

USPC .......... 267/141.2, 141.3, 141.4, 141.5, 141.7
See application file for complete search history.

(56) References Cited

U.S. PATENT DOCUMENTS

| | | | | |
|---|---|---|---|---|
| 5,046,725 A | * | 9/1991 | Brennan ............ | A63B 21/0632 482/50 |
| 5,927,697 A | * | 7/1999 | Miyamoto .............. | F16F 13/14 267/140.12 |
| 6,644,633 B2 | * | 11/2003 | Graeve ................... | F16F 13/16 267/140.12 |
| 6,651,965 B1 | * | 11/2003 | Vossel ..................... | F16F 13/16 267/140.12 |
| 6,659,435 B2 | * | 12/2003 | Yamaguchi .......... | B60G 15/063 267/140.12 |
| 6,729,611 B2 | * | 5/2004 | Deschaume ............. | B60G 7/02 267/140.12 |
| 2005/0230889 A1 | * | 10/2005 | Minamisawa ...... | F16F 13/1418 267/140.12 |
| 2008/0079205 A1 | * | 4/2008 | Hayashi ................ | F16F 1/3828 267/140.13 |
| 2012/0098178 A1 | * | 4/2012 | Yahata .................. | F16F 1/3863 267/141.2 |

FOREIGN PATENT DOCUMENTS

KR    10-2012-0054255 A    5/2012

* cited by examiner

*Primary Examiner* — Melody Burch
(74) *Attorney, Agent, or Firm* — Knobbe Martens Olson & Bear LLP

(57) ABSTRACT

An assembling device for a bush may include: a bush unit mounted on a part; a connection unit of which the inside is locked and fixed to the bush unit; and a support unit coupled to the connection unit, and supporting the bush unit so as to prevent separation of the bush unit.

7 Claims, 6 Drawing Sheets

ASSEMBLING DEVICE FOR BUSH

CROSS-REFERENCES TO RELATED APPLICATIONS

The present application claims priority to Korean application number 10-2013-0128116, filed on Oct. 25, 2013, which is incorporated by reference in its entirety.

BACKGROUND

The present disclosure relates to an assembling device for a bush, and more particularly, to an assembling device for a bush, which can stably support a bush and be widely used.

In general, a multi-link suspension of a vehicle connects a hub to a sub-frame, the hub including a plurality of independent arms coupled to a wheel. A front-wheel or rear-wheel member of the suspension is mounted on a vehicle body through a bush, and a stopper is applied to minimize a risk caused by separation of the bush. A protrusion formed on the stopper is pressed into an inner pipe of the bush.

The inner pipe must secure a minimum thickness such that the protrusion of the stopper is pressed into the inner pipe of the bush.

In this case, the weight and price of the bush may increase, and the shape design for a rubber part of the bush may be limited. Thus, there is a demand for a structure capable of solving the problem.

The related art is disclosed in Korean Patent Laid-open Publication No. 2012-0115541 published on Nov. 19, 2010 and entitled "Structure of multi-link suspension".

SUMMARY

Embodiments of the present invention are directed to an assembling device for a bush, which is capable of reducing the thickness of an inner pipe of a stopper and reducing the weight of a product.

In one embodiment, an assembling device for a bush may include: a bush unit mounted on a part; a connection unit of which the inside is locked and fixed to the bush unit; and a support unit coupled to the connection unit, and supporting the bush unit so as to prevent separation of the bush unit.

The bush unit may include: an outer pipe; an elastic insertion body inserted into the outer pipe, and having a circular bush belt formed at an end part thereof; and an inner pipe disposed in the insertion body.

The insertion body may have a concave groove formed in the center of the end part thereof, and the bush belt protruding outward may be formed inside the end part of the insertion body.

The outer pipe and the inner pipe may be formed of a metallic material.

The part may include a front-wheel member or rear-wheel member of a vehicle suspension.

The connection unit may include: a connection body formed in a ring shape, and having an insertion groove into which the bush unit is inserted; and a coupling protrusion extended from the connection body, and coupled to the support unit.

The support unit may include: a support plate supporting the bush unit, and having a circular plate shape of which the center is opened; and a center plate extended from the inside of the support plate, and having a coupling hole part to which the coupling protrusion is locked and fixed.

The support plate may have a flat surface to be pressed against the ground surface, and the center plate may be formed in a protruding shape to be separated from the ground surface, and inserted into the concave groove of the insertion body of the bush unit.

The center plate may include: a cylindrical protruding plate protruding in a lateral direction from the support plate; and a connection plate connecting the end part of the protruding plate.

The coupling hole part may include: a center hole formed in the center of the center plate; a through-hole which communicates with the center hole and through which the coupling protrusion passes; and a locking hole which is formed in the center plate and into which the end part of the coupling protrusion is inserted, locked, and fixed.

The locking hole may be formed to be separated from the through hole, and disposed in alignment with the through-hole.

In accordance with the embodiment of the present invention, the assembling device for a bush may maintain the state in which the bush unit and the support unit are connected through the connection unit. Thus, the thickness of the inner pipe of the bush unit may be reduced.

Furthermore, since the connection unit coupled to the support unit is mounted on the bush unit, the support unit may be commonly used even though various types of bush units are used.

Furthermore, since the connection unit is formed of a plastic material, the weight of the product may be reduced.

DESCRIPTION OF SPECIFIC EMBODIMENTS

Embodiments of the invention will hereinafter be described in detail with reference to the accompanying drawings. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
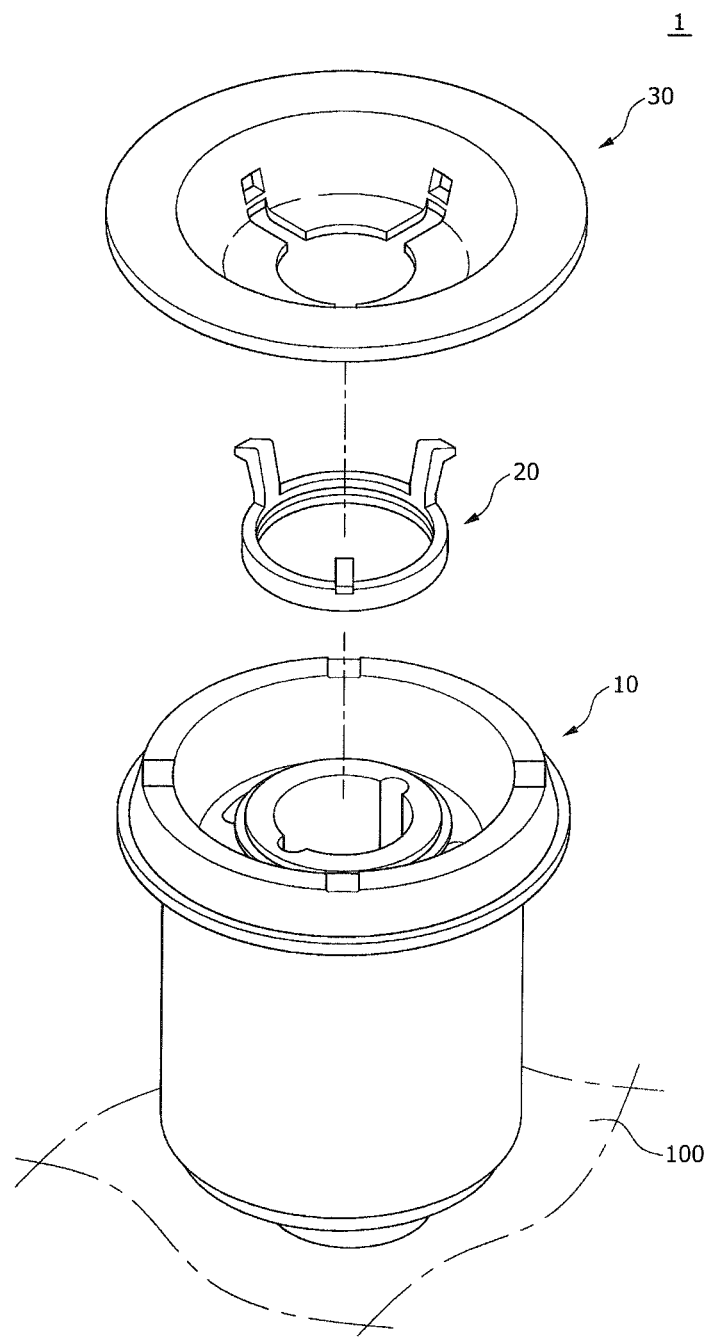
FIG. 1 is an exploded perspective view of an assembling device for a bush in accordance with an embodiment of the present invention.
Figure 2:
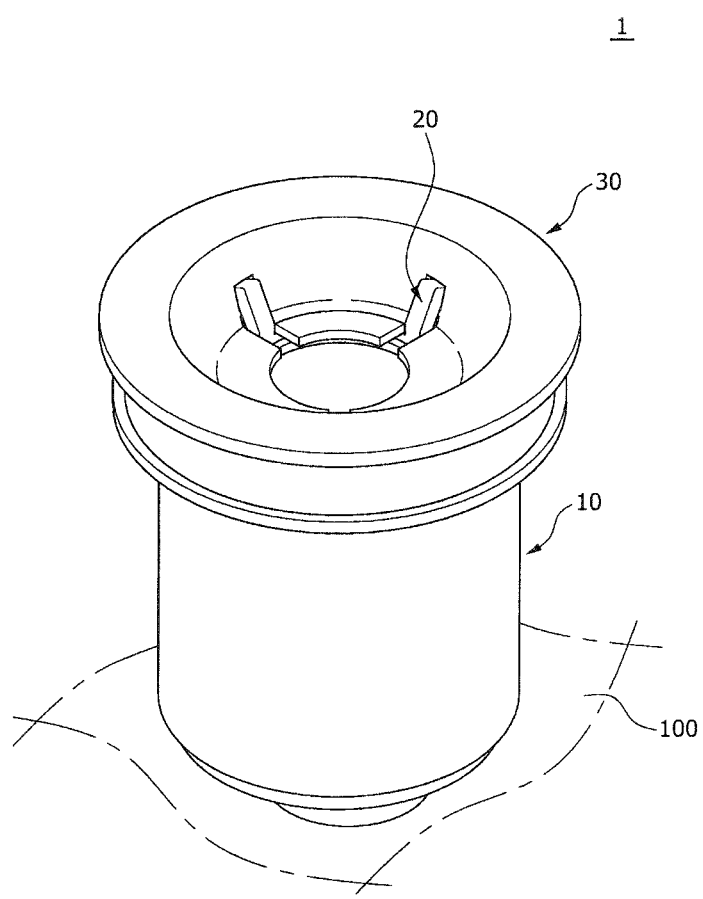
FIG. 2 is an assembled perspective view of the assembling device for a bush in accordance with the embodiment of the present invention.
Figures 3A, 3B:
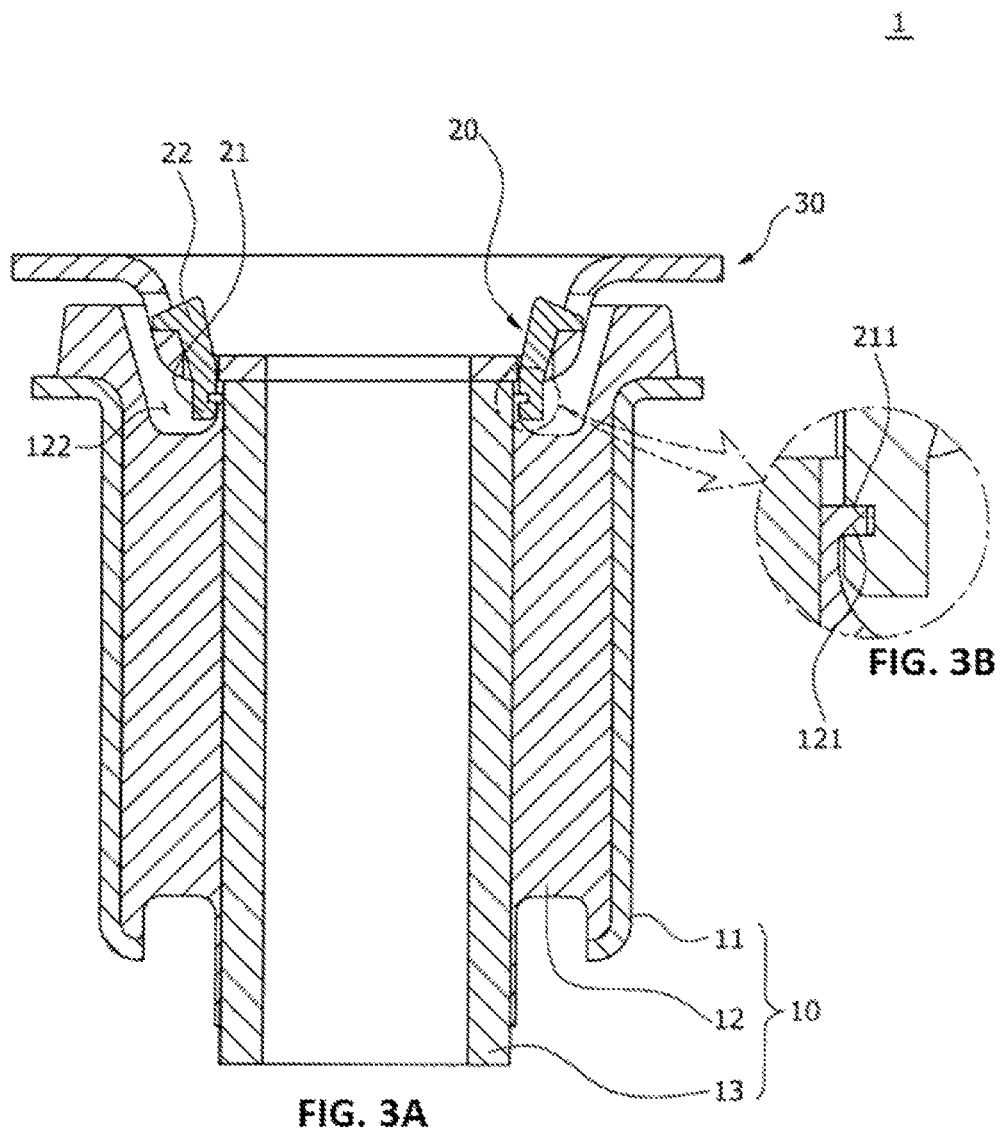
FIG. 3A and FIG. 3B illustrate a cross-sectional view of the assembling device for a bush in accordance with the embodiment of the present invention.

FIG. 1 is an exploded perspective view of an assembling device for a bush in accordance with an embodiment of the present invention. FIG. 2 is an assembled perspective view of the assembling device for a bush in accordance with the embodiment of the present invention. FIG. 3A and FIG. 3B illustrate a cross-sectional view of the assembling device for a bush in accordance with the embodiment of the present invention.

Referring to FIGS. 1 through 3B, the assembling device 1 for a bush in accordance with the embodiment of the present invention may include a bush unit 10, a connection unit (bush coupler) 20, and a support unit (bush support) 30.

The bush unit 10 is mounted on a part 100. The part 100 may include a front-wheel or rear-wheel member of a vehicle suspension.

The inside of the connection unit 20 may be locked and fixed to the bush unit 10, and the connection unit 20 may be coupled to the support unit 30. The support unit 30 may support the bush unit 10 so as to prevent separation of the bush unit 10.

Figure 4:
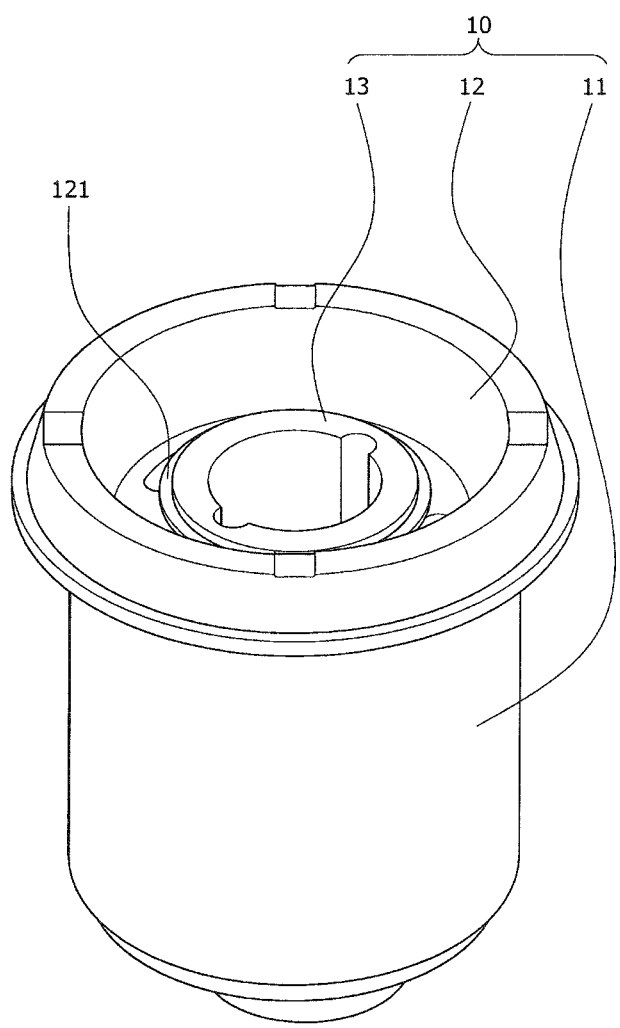
FIG. 4 is a diagram schematically illustrating a bush unit of the assembling device for a device in accordance with the embodiment of the present invention.

FIG. 4 is a diagram schematically illustrating the bush unit of the assembling device for a device in accordance with the embodiment of the present invention.

Referring to FIGS. 1 to 4, the bush unit 10 in accordance with the embodiment of the present invention may include an outer pipe 11, an insertion body 12, and an inner pipe 13.

The insertion body 12 may be inserted into the outer pipe 11, and the inner pipe 13 may be inserted into the insertion body 12.

The outer pipe 11 and the inner pipe 13 may be formed of a metallic material, and the insertion body 12 may be formed of an elastic material such as rubber.

The insertion body 12 may include a circular bush belt 121 formed at an end part thereof. For example, the insertion body 12 may have a concave groove 122 formed in the center of the end part thereof, and the bush belt 121 may be formed inside the end part of the insertion body 12 so as to protrude outward.

Figure 5:
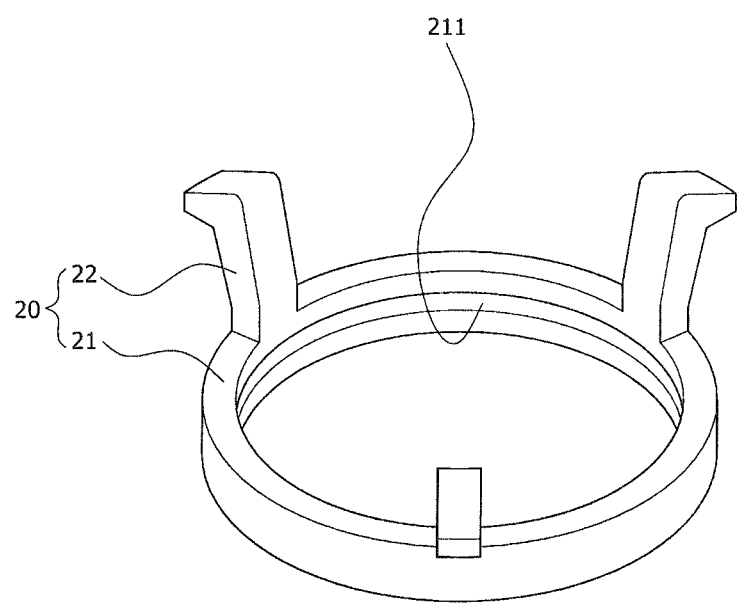
FIG. 5 is a diagram schematically illustrating a connection unit in the assembling device for a bush in accordance with the embodiment of the present invention.

FIG. 5 is a diagram schematically illustrating the connection unit in the assembling device for a bush in accordance with the embodiment of the present invention.

Referring to FIGS. 1 through 3B and FIG. 5, the connection unit (bush coupler) 20 in accordance with the embodiment of the present invention may include a connection body 21 and a plurality of coupling protrusions 22. The connection unit 20 may be formed of a plastic material for reducing the weight thereof, and the connection body 21 and the coupling protrusions 22 may be integrated with each other.

The connection body 21 may have a ring shape. The connection body 21 may have a larger diameter than the inner pipe 13 such that the end of the inner pipe 13 is inserted into the connection body 21. The connection body 21 may have an insertion groove 211 formed therein, into which the bush unit 10 is inserted.

For example, the insertion groove 211 may be formed along the inner circumferential surface of the connection body 21, and the connection body 21 may be positioned in the concave groove 122 such that the inner pipe 13 is inserted into the connection body 21. At this time, the bush belt 121 may be inserted into the insertion groove 211.

The coupling protrusions 22 may be extended from the connection body 21, and coupled to the support unit 30. For example, three coupling protrusions 22 may be extended from the connection body 21, and end parts of the coupling protrusions 22 may be formed in a hook shape protruding outward and locked and fixed to the support unit 30.

Figure 6:
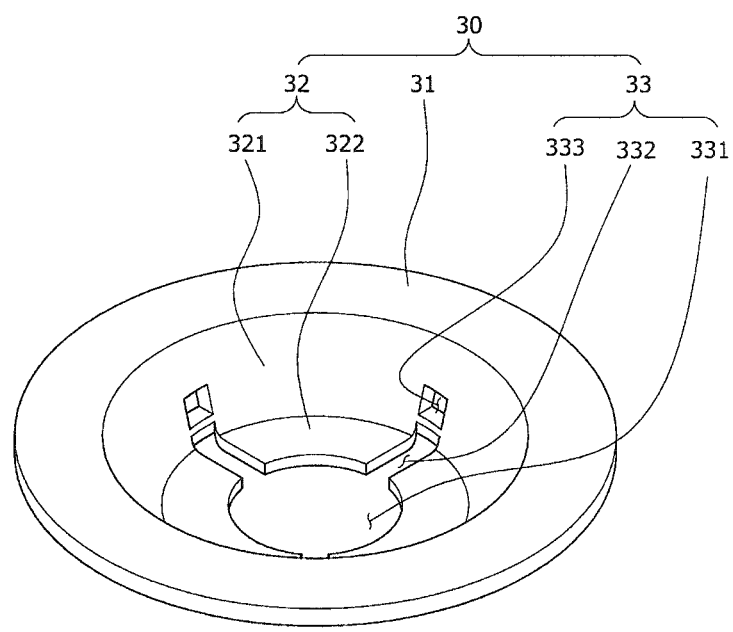
FIG. 6 is a diagram schematically illustrating a support unit in the assembling device for a bush in accordance with the embodiment of the present invention.

FIG. 6 is a diagram schematically illustrating the support unit in the assembling device for a bush in accordance with the embodiment of the present invention.

Referring to FIGS. 1 through 3B and FIG. 6, the support unit (bush support) 30 in accordance with the embodiment of the present invention may include a support plate 31 and a center plate 32.

The support plate 31 may support the bush unit 10, and have a circular plate shape of which the center is opened. The center plate 32 may be extended from the inside of the support plate 31. The center plate 32 may have a plurality of coupling hole parts 33 formed therein, to which the coupling protrusions 22 are locked and fixed.

For example, the support plate 31 may have a flat surface to be pressed against the ground surface, and the center plate 32 may be formed in a protruding shape to be separated from the ground surface, and inserted into the concave groove 122 of the insertion body 12.

Furthermore, the center plate 32 may include a cylindrical protruding plate 321 protruding in a lateral direction from the support plate 31 and a connection plate 322 connecting the end part of the protruding plate 321.

The coupling hole part 33 in accordance with the embodiment of the present invention may include a center hole 331, a through-hole 332, and a locking hole 333.

The center hole 331 may be formed in the center of the center plate 32, and the through-hole 332 may communicate with the center hole 331. The coupling protrusion 22 may pass through the through-hole 332.

The locking hole 333 may be formed in the center plate 32 so as to be separated from the through-hole 332. The end part of the coupling protrusion 22 may be inserted into the locking hole 333 so as to be locked and fixed to the locking hole 333.

For example, the center hole 331 may be formed in the center of the connection plate 322, and three through-holes 332 may be formed in a radial direction of the center hole 331. Furthermore, the locking hole 333 may be formed in the protruding plate 321 disposed in alignment with each of the through-holes 332.

The operation and effect of the assembling device for a bush in accordance with the embodiment of the present invention will be described as follows.

The connection body 21 may be positioned in the concave groove 122 such that the inner pipe 13 is inserted into the connection body 21.

At this time, the elastic bush belt 121 formed at the end part of the insertion body 12 is pressed into the connection body 21.

When the connection body 21 is brought close to the insertion body 12, the bush belt 121 may be inserted into the insertion groove 211 formed in the connection body 21 such that the bush unit 10 and the connection unit 20 maintains the coupled state.

In such a state, the center plate 32 protruding from the support plate 31 may be brought close to the connection body 21. At this time, the coupling protrusions 22 formed on the connection body 21 may pass through the through-holes 332, respectively.

When the support plate 31 is brought close to the connection body 21, the elastic coupling protrusions 22 may be locked and fixed to the locking holes 333 while moved along the inside of the center plate 32. Then, the connection unit 20 and the support unit 30 may maintain the coupled state.

The assembling device 1 for a bush in accordance with the embodiment of the present invention may maintain the state in which the bush unit 10 and the support unit 30 are connected through the connection unit 20. Thus, the thickness of the inner pipe 13 of the bush unit 10 may be reduced.

Furthermore, since the connection unit 20 coupled to the support unit 30 is mounted on the bush unit 10, the support unit 30 may be commonly used even though various types of bush units 10 are used.

Furthermore, since the connection unit 20 is formed of a plastic material, the weight of the product may be reduced.

Although embodiments of the invention have been disclosed for illustrative purposes, those skilled in the art will appreciate that various modifications, additions and substitutions are possible, possible, without departing from the scope and spirit of the invention as defined in the accompanying claims.

What is claimed is:

1. A suspension system of a vehicle comprising:
   a bush assembly comprising an inner pipe extending along an axis, an outer pipe generally concentrically surrounding the inner pipe, and an elastic body inserted between the inner and outer pipes such that the elastic body has an end portion surrounding the inner pipe when viewed in a direction along the axis;
   the end portion of the elastic body comprising an annular recess depressed into the elastic body in the direction along the axis such that the annular recess defines an inner sidewall that surrounds the inner pipe and faces away from the inner pipe;
   the end portion of the elastic body comprising a flange protruding from the inner sidewall into the annular recess and away from the inner pipe;
   a bush support comprising a support bottom and a support sidewall, the support bottom comprising at least one plate, a central opening and a plurality of peripheral openings that are radially outside the central opening, the support sidewall extending from the at least one plate and comprising a plurality of holes; and
   a bush coupler comprising a ring-shaped body and a plurality of protrusions extending from the ring-shaped body, the ring-shaped body comprising an inner sidewall and an insertion groove formed on the inner sidewall;
   wherein the ring-shaped body of the bush coupler is at least in part received in the annular recess of the end portion of the elastic body such that the inner sidewall of the ring-shaped body opposes the inner sidewall of the end portion and further such that the flange protruding from the inner sidewall of the end portion is inserted into the insertion groove formed on the inner sidewall of the ring-shaped body,
   wherein the bush support is placed over the inner pipe and the end portion of the elastic body such that the central opening of the support bottom is aligned with the inner pipe, such that the plurality of the peripheral openings of the support bottom are aligned with the annular recess of the end portion of the elastic body, and such that each of the plurality of coupling protrusions of the bush coupler passes one of the plurality of peripheral openings of the support bottom and is received by a corresponding one of the plurality of holes.

2. The suspension system of claim 1, wherein the support bottom abuts an end portion of the inner pipe.

3. The suspension system of claim 1, wherein the outer pipe and the inner pipe are formed of a metallic material.

4. The suspension system of claim 1, wherein the bush assembly is mounted on a front-wheel member or rear-wheel member of a vehicle.

5. The suspension system of claim 1, wherein the bush support further comprises a top annular flange extending from the support sidewall, the top annular flange surrounding the support bottom when viewed in the direction along the axis.

6. The suspension system of claim 1, wherein the plurality of peripheral openings are connected to the central opening.

7. The suspension system of claim 1, wherein the bush coupler is a plastic coupler.

* * * * *